United States Patent
Hoyt et al.

(10) Patent No.: US 6,799,688 B2
(45) Date of Patent: Oct. 5, 2004

(54) BASE FOR ELEVATING A STRAINER OR COLANDER

(76) Inventors: Daniel R. Hoyt, 273 Foxmoor Rd., Fox River Grove, IL (US) 60021-1880; Larry Mullinax, 21 Oakdale Dr., Cartersville, GA (US) 30120

( * ) Notice: Subject to any disclaimer, the term of this patent is extended or adjusted under 35 U.S.C. 154(b) by 0 days.

(21) Appl. No.: 10/064,488

(22) Filed: Jul. 19, 2002

(65) Prior Publication Data

US 2003/0000888 A1 Jan. 2, 2003

Related U.S. Application Data

(60) Provisional application No. 60/319,171, filed on Apr. 5, 2002.

(51) Int. Cl.[7] .......................... B01D 35/02; B01D 35/28
(52) U.S. Cl. .................. 210/464; 210/473; 210/497.01
(58) Field of Search ................................ 210/464, 469, 210/473, 497.01, 470, 474

(56) References Cited

U.S. PATENT DOCUMENTS 4,626,352 A * 12/1986 Massey et al. .............. 210/469
5,853,581 A * 12/1998 Rayborn et al. ............ 210/469

* cited by examiner

Primary Examiner—David A Reifsnyder
(74) Attorney, Agent, or Firm—Trexler, Bushnell, Giangiorgi, Blackstone & Marr, Ltd.

(57) ABSTRACT

A base is used to elevate a strainer or colander in a stable fashion from drain waters which build up into a sink or basin, while providing drainage for the strainer or colander. Use of the base minimizes the risk of food stuffs becoming contaminated by the backup of waters in a sink/basin. A strainer or colander may be modified to include detachable, removable, foldable or collapsible legs or base which elevates a body of the strainer or colander from drain waters which build up into a sink or basin.

27 Claims, 3 Drawing Sheets

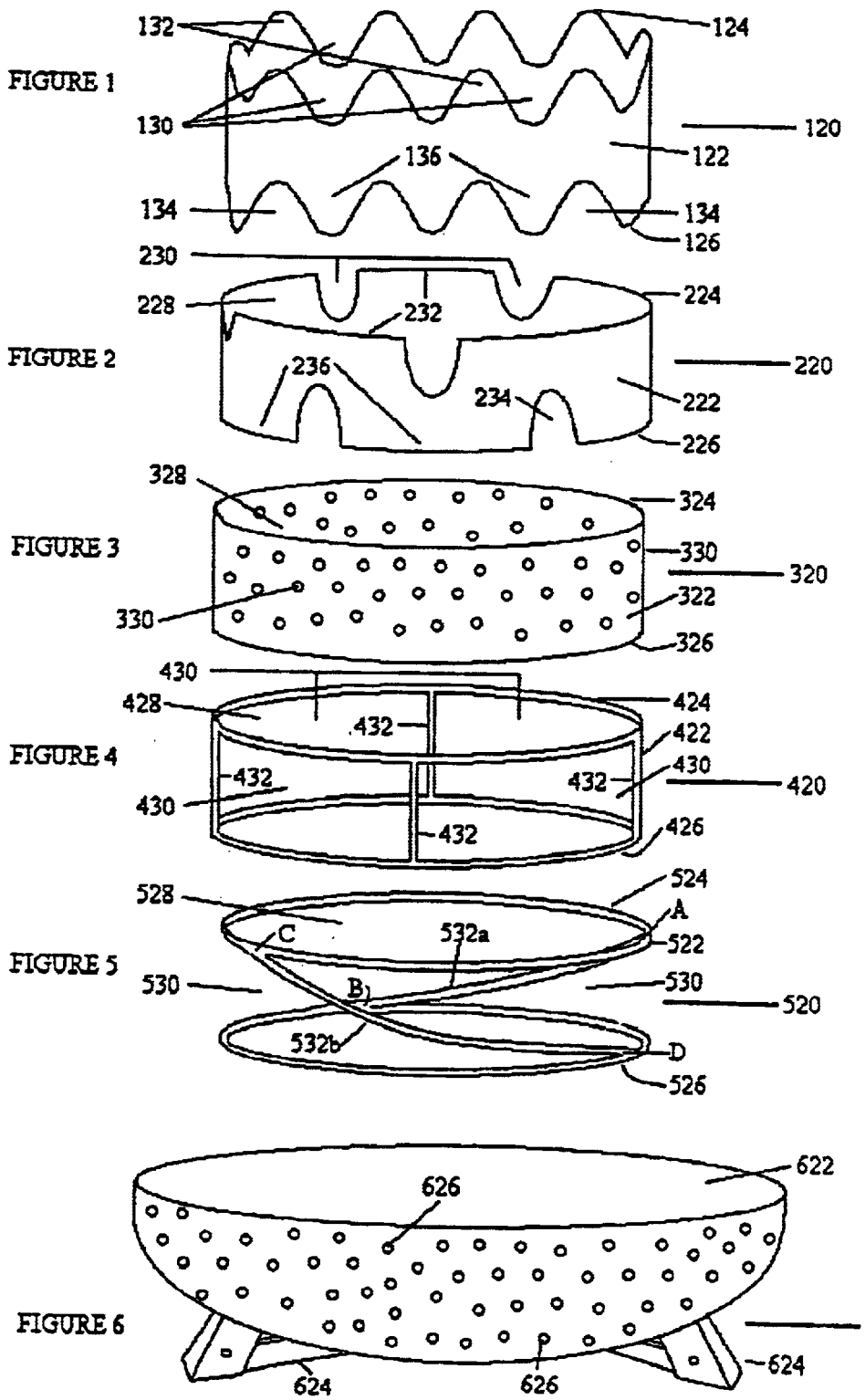

BASE FOR ELEVATING A STRAINER OR COLANDER

CROSS REFERENCE TO RELATED APPLICATIONS

This application claims the benefit of Provisional Application No. 60/319,171 filed on Apr. 5, 2002.

BACKGROUND OF THE INVENTION

The basic strainer/colander is a tool which was invented long ago and for which there is no longer patent protection other than design patents that are issued from time to time. The problem with the tool is that, over time, improvements have not been made to account for its modern day use in sinks/basins while still being of a size to fit in dishwashing machines. Typically, the tool comes with permanently attached legs or a base upon which it rests. The drawback is that the legs or base cannot be of a length which affords sufficient protection from coming into contact with fluids that may back up in a sink or basin due to inadequate drainage rates. Were sufficient legs or base added to afford protection, the tool would no longer conveniently fit into dishwashers (particularly the top rack as may be recommended for many plastics). In addition, larger permanent legs or base would necessarily consume additional storage space, a commodity in most kitchens.

SUMMARY OF INVENTION

The present invention is a non-permanent base for a strainer or colander. The non-permanent base for a portable and universal device separate and apart from existing food strainers/colanders which provides an adequate base to support food strainers/colanders and stably elevate such strainers/colanders, while providing adequate drainage for the strainer or colander and thereby prevent the contamination of the food products contained in the strainer or colander from fluids which may not otherwise be capable of adequately draining in a time or manner which would prevent such unsanitary contact. In addition, the present invention provides a new strainer or colander which incorporates either removable, detachable, foldable or collapsible legs or base which provides an adequate base to support the strainer or colander and elevate it while providing adequate drainage thereby preventing contamination of the food products contained in the strainer or colander from fluids which may not otherwise be capable of adequately draining in a time or manner which would prevent such unsanitary contact.

BRIEF DESCRIPTION OF DRAWINGS

FIG. 1 is a perspective view of a base which incorporates the features of a first embodiment of the invention;

FIG. 2 is a perspective view of a base which incorporates the features of a second embodiment of the invention;

FIG. 3 is a perspective view of a base which incorporates the features of a third embodiment of the invention;

FIG. 4 is a perspective view of a base which incorporates the features of a fourth embodiment of the invention;

FIG. 5 is a perspective view of a base which incorporates the features of a fifth embodiment of the invention;

FIG. 6 is a perspective view of a strainer or colander which incorporates the features of a sixth embodiment of the invention.

DETAILED DESCRIPTION

Figure 1A:
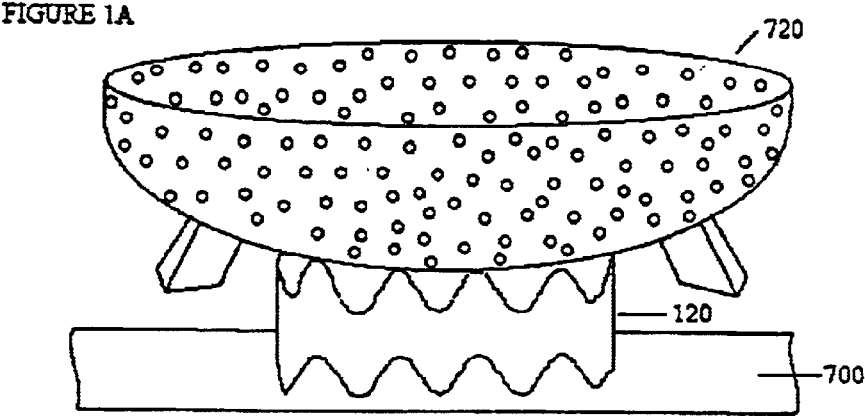
FIG. 1A is a side elevational view of the base of FIG. 1 shown with a prior art strainer or colander placed thereon.
Figure 2A:
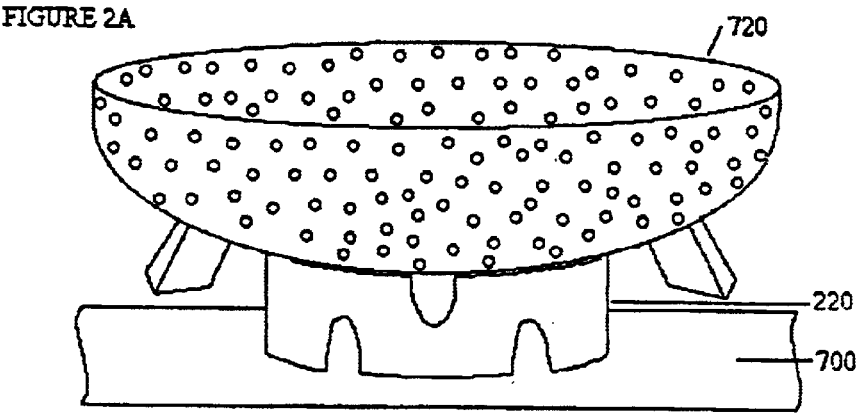
FIG. 2A is a side elevational view of the base of FIG. 2 shown with a prior art strainer or colander placed thereon.
Figure 3A:
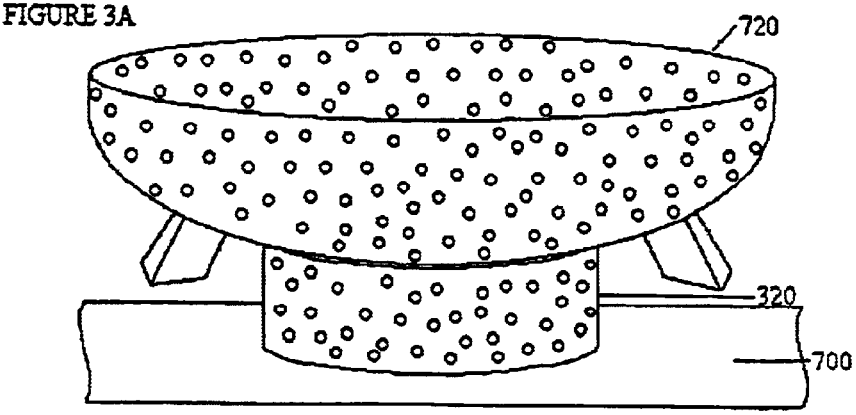
FIG. 3A is a side elevational view of the base of FIG. 3 shown with a prior art strainer or colander placed thereon.
Figure 4A:
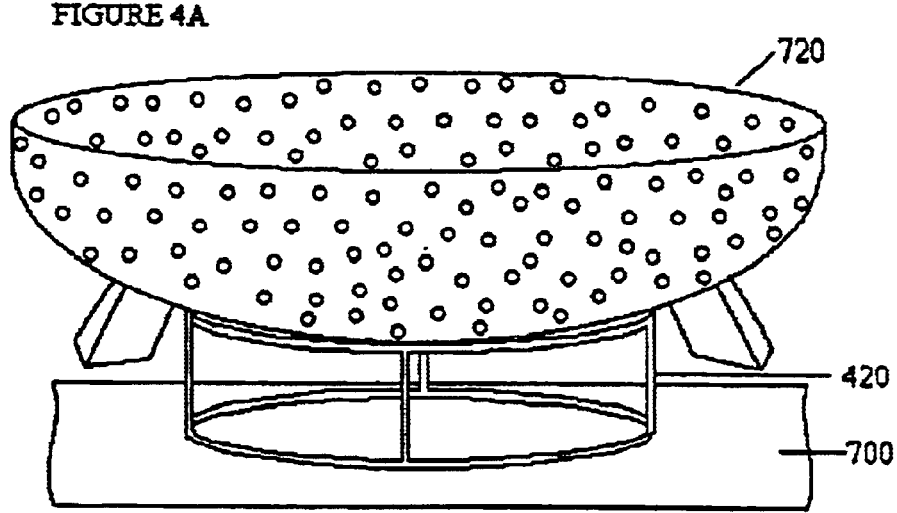
FIG. 4A is a side elevational view of the base of FIG. 4 shown with a prior art strainer or colander placed thereon.
Figure 5A:
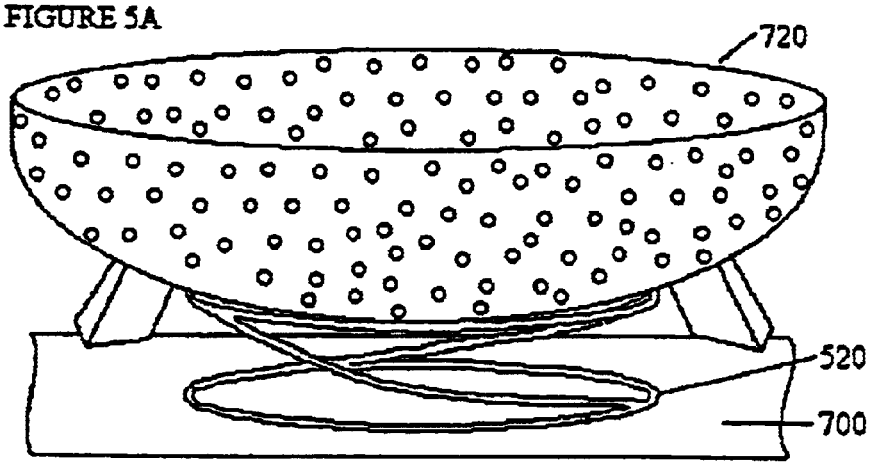
FIG. 5A is a side elevational view of the base of FIG. 5 shown with a prior art strainer or colander placed thereon.

The present invention provides a kitchen accessory device 120, 220, 320, 420, 520, 620 which elevates food strainers/colanders in sinks/basin. The kitchen accessory device 120, 220, 320, 420, 520, 620 avoids the risk of overflow waters backing up in the sink/basin drain and creating an unsanitary condition by contaminating the food products in the strainer or colander. The kitchen accessory device 120, 220, 320, 420, 520, 620 is provided either by a non-permanent base 120, 220, 320, 420, 520 for a strainer or colander as is shown in FIGS. 1–5 or a strainer or colander 620 as is shown in FIG. 6. A first embodiment of the base 120 is shown in FIG. 1; a second embodiment of the base 220 is shown in FIG. 2; a third embodiment of the base 320 is shown in FIG. 3; a fourth embodiment of the base 420 is shown in FIG. 4; and a fifth embodiment of the base 520 is shown in FIG. 5. In each of the embodiments of the base 120, 220, 320, 420, 520 shown in FIGS. 1–5, a strainer or colander 700 made in accordance with the prior art is placed on top thereof in use.

Attention is invited to the first embodiment of the base 120 shown in FIG. 1. The base 120 is formed from either food grade or non-food grade material and can be formed from plastic, metal, wood, etc.

The base 120 includes a body portion 122 having an upper end 124 and a lower end 126. A passageway 128 is formed through the body portion 122 from the upper end 124 to the lower end 126 such that ends of the passageway 128 are open. As shown in FIG. 1, the body portion 122 has a generally circular cross-section, however, it is to be understood that the cross-sectional shape of the body portion 122 can take a variety of forms, such as a square, a hexagon, an octagon, oblong, an hourglass and the like. The height of the base 120 from the upper end 124 to the lower end 126 is at least 1.1 inches, such that when a strainer or colander is placed on the base 120, the strainer or colander is elevated more than 1.1 inches from the surface on which it rests. This elevation provides for stability and affords sufficient elevation to allow for adequate drainage. The upper end 124 of the base 120 has a diameter which is greater than 3.0 inches, and the lower end 126 of the base 120 has a diameter which is greater than 3.25 inches. Accordingly, the base 120 tapers outwardly from the upper end 124 to the lower end 126. This provides for stability and affords a universal fit to both sink/basin drains and strainers/colanders.

Around the upper end 124 of the body portion 120, a plurality of spaced-apart apertures 130 are provided. The portions 132 of the upper end 124 between the apertures 130 are generally rounded such that a plurality of alternating generally concave and convex surfaces are respectively formed by the apertures 130 and the rounded portions 132 in the upper end 124. Around the lower end 126 of the body portion 120, a plurality of spaced-apart apertures 134 are provided. The portions 136 of the lower end 126 between the apertures 134 are generally rounded such that a plurality of alternating generally concave and convex surfaces are respectively formed by the apertures 134 and the rounded portions 136 in the lower end 126. The apertures 130 in the upper end 124 are not aligned with the apertures 134 in the lower end 126. The apertures 130 in the upper end 124 and the apertures 134 in the lower end 126 are in fluid communication with the passageway 128.

In use, the base 120 is placed in a sink or basin with the lower end 126 contacting the surface 700 of the sink or basin. The base 120 contacts the surface 700 of the sink or basin at the lowermost points of the rounded portions 136 of the lower end 126. Thereafter, a strainer or colander 720, made in accordance with the prior art, is placed on top of the base 120, and the strainer or colander 720 contacts the base 120 at the highest points of the rounded surfaces 132 on the upper end 124. The water from the food stuffs being drained passes through the strainer or colander 720. The water that passes from the strainer or colander 720 flows freely into the passageway 128, and then flows freely through the apertures 130, 134.

Alternatively, the base 120 can be attached to a strainer or colander 720 by pressure fitting, tongue-in-grove with pressure release or release tab(s), threads, collapsible inserts, or removable or foldable legs that insert and are held in place.

When the water is finished being drained from the strainer or colander 720, the strainer or colander 720 is lifted or removed from the base 120 and placed into the dishwasher or hand washed. The base 120 can also be placed in the dishwasher or handwashed. Accordingly, the base 120 is a separate member from the strainer or colander 720 and is portable.

Attention is invited to the second embodiment of the base 220 shown in FIG. 2. The base 220 is formed from either food grade or non-food grade material and can be formed from plastic, metal, wood, etc.

The base 220 includes a body portion 222 having an upper end 224 and a lower end 226. A passageway 228 is formed through the body portion 222 from the upper end 224 to the lower end 226 such that ends of the passageway 228 are open. As shown in FIG. 2, the body portion 222 has a generally circular cross-section, however, it is to be understood that the crosssectional shape of the body portion 222 can take a variety of forms, such as a square, a hexagon, an octagon, oblong, an hourglass and the like. The height of the base 220 from the upper end 224 to the lower end 226 is at least 1.1 inches, such that when a strainer or colander is placed on the base 220, the strainer or colander is elevated more than 1.1 inches from the surface on which it rests for purposes of stability and affording sufficient elevation to allow for adequate drainage. The upper end 224 of the base 220 has a diameter which is greater than 3.0 inches, and the lower end 226 of the base 220 has a diameter which is greater than 3.25 inches. Accordingly, the base 220 tapers outwardly from the upper end 224 to the lower end 226. This provides for stability and affords a universal fit to both sink/basin drains and strainers/colanders.

The upper end 224 of the body portion 222 has a plurality of spaced apart apertures 230 therein. As shown, three apertures 230 are provided; the apertures 230 are equidistantly spaced apart from each other, and the apertures 230 are generally arcuate. Between the in the apertures 230 in the upper end 224, flat surfaces 232 are provided. The lower end 226 of the body portion 222 has a plurality of spaced apart apertures 234 therein. Three apertures 234 are provided; the apertures 234 are equi-distantly spaced apart from each other, and the apertures 234 are generally arcuate. The apertures 230 in the upper end 224 are not aligned with the apertures 234 in the lower end. Between the apertures 234 in the lower end 226, flat surfaces 236 are provided. The apertures 230 in the upper end 224 and the apertures 234 in the lower end 226 are in fluid communication with the passageway 228.

In use, the base 220 is placed in a sink or basin with the flat surfaces 236 of the lower end 226 contacting the surface 700 of the sink or basin. Thereafter, a strainer or colander 720 is placed on top of the base 220, and the strainer or colander 720 contacts the base 220 at the flat surfaces 232 of the upper end 224. The water from the food stuffs being drained passes through the strainer or colander 720. The water that passes from the strainer or colander 720 flows freely into the passageway 228, and then flows freely through the apertures 230, 234.

Alternatively, the base 220 can be attached to a strainer or colander 720 by pressure fitting, tongue-in-grove with pressure release or release tab(s), threads, collapsible inserts, or removable or foldable legs that insert and are held in place.

When the water is finished being drained from the strainer or colander 720, the strainer or colander 720 is lifted or removed from the base 220 and placed into the dishwasher or hand washed. The base 220 can also be placed in the dishwasher or handwashed. Accordingly, the base 200 is a separate member from the strainer or colander 720 and is portable.

Attention is invited to the third embodiment of the base 320 shown in FIG. 3. The base 320 is formed from either food grade or non-food grade material and can be formed from plastic, metal, wood, etc.

The base 320 includes a body portion 322 having an upper end 324 and a lower end 326. The upper end 324 is parallel to the lower end 326. A passageway 328 is formed through the body portion 322 from the upper end 324 to the lower end 326 such that ends of the passageway 328 are open. As shown in FIG. 3, the body portion 322 has a generally circular crosssection, however, it is to be understood that the cross-sectional shape of the body portion can take a variety of forms, such as a square, a hexagon, an octagon, oblong, an hourglass and the like. The height of the base 320 from the upper end 324 to the lower end 326 is at least 1.1 inches, such that when a strainer or colander is placed on the base 320, the strainer or colander is elevated more than 1.1 inches from the surface on which it rests for purposes of stability and affording sufficient elevation to allow for adequate drainage. The upper end 324 of the base 320 has a diameter which is greater than 3.0 inches, and the lower end 326 of the base 320 has a diameter which is greater than 3.25 inches. Accordingly, the base 320 tapers outwardly from the upper end 324 to the lower end 326. This provides for stability and affords a universal fit to both sink/basin drains and strainers/colanders.

The upper end 324 is flat and the lower end 326 is flat. The body 322 is provided with a plurality of spaced apart apertures 330 therethrough which are in fluid communication with the passageway 328. As shown, the apertures 330 are formed from small circles.

In use, the base 320 is placed in a sink or basin with the lower end 326 contacting the surface 700 of the sink or basin. Thereafter, a strainer or colander 720 is placed on top of the base 320, and the strainer or colander 720 contacts the upper end 324 of the base 320. The water from the food stuffs being drained passes through the strainer or colander 720. The water that passes from the strainer or colander 720 flows freely into the passageway 328, and then flows freely through the apertures 330.

Alternatively, the base 320 can be attached to a strainer or colander 720 by pressure fitting, tongue-in-grove with pressure release or release tab(s), threads, collapsible inserts, or removable or foldable legs that insert and are held in place.

When the water is finished being drained from the strainer or colander 720, the strainer or colander 720 is lifted or removed from the base 320 and placed into the dishwasher or hand washed. The base 320 can also be placed in the dishwasher or handwashed. Accordingly, the base 320 is a separate member from the strainer or colander 720 and is portable.

Attention is invited to the fourth embodiment of the base 420 shown in FIG. 4. The base 420 is formed from either food grade or non-food grade material and can be formed from plastic, metal, wood, etc.

The base 420 includes a body portion 422 having an upper end 424 and a lower end 426. The upper end 424 is parallel to the lower end 426. A passageway 428 is formed through the body portion 422 from the upper end 424 to the lower end 426 such that ends of the passageway 428 are open. As shown in FIG. 4, the upper and lower ends 424, 426 of the body portion 422 have a generally circular cross-section, however, it is to be understood that the crosssectional shape of the body portion 422 can take a variety of forms, such as a square, a hexagon, an octagon, oblong, an hourglass and the like. The height of the base 420 from the upperend 424 to the lower end 426 is at least 1.1 inches, such that when a strainer or colander is placed on the base 120, the strainer or colander is elevated more than 1.1 inches from the surface on which it rests for purposes of stability and affording sufficient elevation to allow for adequate drainage. The upper end 424 of the base 420 has a diameter which is greater than 3.0 inches, and the lower end 426 of the base 420 has a diameter which is greater than 3.25 inches. Accordingly, the base 420 tapers outwardly from the upper end 424 to the lower end 426. This provides for stability and affords a universal fit to both sink/basin drains and strainers/ colanders.

The upper end 424 is flat and the lower end 426 is flat. The body 422 is provided with a plurality of apertures 430 therethrough (shown as four apertures 430 in the drawings) which are spaced apart from each other by a rib 432 (four ribs 432 are provided to form the four apertures 430). Each rib 432 is parallel to one another and extends perpendicularly to the plane of the flat surfaces formed by the first and second ends 424, 426. As shown, each aperture 430 is generally formed as a square. The apertures 430 are in fluid communication with the passageway 428.

In use, the base 430 is placed in a sink or basin with the lower end 426 contacting the surface 700 of the sink or basin. Thereafter, a strainer or colander 720 is placed on top of the base 420, and the strainer or colander 720 contacts the upper end 424 of the base 420. The water from the food stuffs being drained passes through the strainer or colander 720. The water that passes from the strainer or colander 720 flows freely into the passageway 428, and then flows freely through the apertures 430.

Alternatively, the base 430 can be attached to a strainer or colander 720 by pressure fitting, tongue-in-grove with pressure release or release tab(s), threads, collapsible inserts, or removable or foldable legs that insert and are held in place.

When the water is finished being drained from the strainer or colander 720, the strainer or colander 720 is lifted or removed from the base 420 and placed into the dishwasher or hand washed. The base 420 can also be placed in the dishwasher or handwashed. Accordingly, the base 420 is a separate member from the strainer or colander 720 and is portable.

Attention is invited to the fifth embodiment of the base 520 shown in FIG. 5. The base 520 is formed from either food grade or non-food grade material and can be formed from plastic, metal, wood, etc.

The base 520 includes a body portion 522 having an upper end 524 and a lower end 526. The upper end 524 is parallel to the lower end 526. A passageway 528 is formed through the body portion 522 from the upper end 524 to the lower end 526 such that ends of the passageway. 528 are open. As shown in FIG. 5, the upper and lower ends 524, 526 of the body portion 522 have a generally circular cross-section, however, it is to be understood that the crosssectional shape of the body portion 522 can take a variety of forms, such as a square, a hexagon, an octagon, oblong, an hourglass and the like. The height of the base 520 from the upper end 524 to the lower end 526 is at least 1.1 inches, such that when a strainer or colander is placed on the base 520, the strainer or colander is elevated more than 1.1 inches from the surface on which it rests for purposes of stability and affording sufficient elevation to allow for adequate drainage. The upper end 524 of the base 520 has a diameter which is greater than 3.0 inches, and the lower end 526 of the base 520 has a diameter which is greater than 3.25 inches. Accordingly, the base 520 tapers outwardly from the upper end 524 to the lower end 526. This provides for stability and affords a universal fit to both sink/basin drains and strainers/ colanders.

The upper end 524 is flat and the lower end 526 is flat. The body 522 is provided with a plurality of apertures 530 therethrough (shown as two apertures 530 in the drawings) which are spaced apart from each other by a rib 532a, 532b (two ribs 532a, 532b are provided to form the two apertures 530). Rib 532a joins with the upper end 524 at point A and joins with the lower end 526 at point B. Rib 532b joins with the upper end 524 at point C and joins with the lower end 526 at point D. Points A and C are spaced apart from each other on the upper end 524 approximately one hundred and eighty degrees. When looking at the base 520 from a top plan view, point A would be at approximately ninety degrees and point B would be at approximately one hundred and eighty degrees. Points B and D are spaced apart from each other on the lower end 526 approximately ninety degrees. When looking at the base 520 from a top plan view, point B would be at approximately zero degrees and point D would be at approximately ninety degrees. The ribs 532a, 532b curve from the upper end 524 to the lower end 526. As shown, each aperture 530 is generally formed from a pair of triangles. The apertures 530 are in fluid communication with the passageway 528.

In use, the base 520 is placed in a sink or basin with the lower end 526 contacting the surface 700 of the sink or basin. Thereafter, a strainer or colander 720 is placed on top of the base 520, and the strainer or colander 720 contacts the upper end 524 of the base 520. The water from the food stuffs being drained passes through the strainer or colander 720. The water that passes from the strainer or colander 720 flows freely into the passageway 528, and then flows freely through the apertures 530.

Alternatively, the base 520 can be attached to a strainer or colander 720 by pressure fitting, tongue-in-grove with pressure release or release tab(s), threads, collapsible inserts, or removable or foldable legs that insert and are held in place.

When the water is finished being drained from the strainer or colander 720, the strainer or colander 720 is lifted or removed from the base 520 and placed into the dishwasher or hand washed. The base 520 can also be placed in the dishwasher or handwashed. Accordingly, the base 520 is a separate member from the strainer or colander 720 and is portable.

In each of the embodiments of the base 120, 220, 320, 420, 520 shown in FIGS. 1–5, the base 120, 220, 320, 420, 520 is universal in that is fits a variety of strainers/colanders on the market. The base 120, 220, 320, 420, 520 provides adequate support for the strainer or colander and elevates the strainer or colander, while providing adequate drainage for the strainer or colander and thereby prevent the contamination of the food products contained in the strainer or colander from fluids which may not otherwise be capable of adequately draining in a time or manner which would prevent such unsanitary contact.

Attention is now invited to FIG. 6 which shows a strainer or colander 620 which incorporates features of the present invention.

The strainer or colander 620 has a body portion 622 which is generally bowl-shaped. A plurality of detachable, removable, foldable or collapsible legs 624 or a base attachment are attached to the underside of the body portion 622. The body portion 622 has means for allowing the water to drain therefrom, such as apertures 626.

The body portion 622 of the strainer or colander 620 is made from food-grade materials. The removable, detachable, foldable or collapsible legs 624 or base attachment are made from either food grade or non food grade materials. The height of the legs 624 or base is at least 1.1 inches in their extended position, such that the body portion 622 is elevated more than 1.1 inches from the surface on which it rests for purposes of stability and affording sufficient elevation to allow for adequate drainage. The legs 624 or base provide an adequate base to support the body portion 622 and to elevate the body portion 622. The legs 624 or base provides adequate space for drainage for the body portion 622 and thereby prevents the contamination of the food products contained in the body portion 622 from fluids which may not otherwise be capable of adequately draining in a time or manner which would prevent such unsanitary contact.

It is to be understood that the claims, descriptions, and drawings of this submission are merely exemplary and that a person or company analyzing the art may make many variations, stylistic changes, and modifications without departing from the spirit or scope of this invention. All such modifications, stylistic changes, variations, and modifications are intended to be included within the scope of the invention as defined in the claims.

What is claimed is:

1. A base for supporting a strainer or colander above a sink/basin surface, said base comprising:
   a body portion having an upper end and a lower end, said lower end of said body portion being placeable on the sink/basin surface, the strainer or colander being placeable on said upper end of said body portion, said upper end being spaced a predetermined distance apart from said lower end; and
   at least one aperture provided through said body portion for allowing water to flow freely therethrough at all times;
   a passageway from said upper end to said at least one aperture, said water flowing freely from the strainer or colander, through said passageway and then through said at least one aperture; and
   wherein said body portion is a separate member from the strainer or colander.

2. A base as defined in claim 1, wherein said at least one aperture is formed from at least two apertures.

3. A base as defined in claim 1, wherein said at least one aperture is a plurality of spaced apart apertures in said upper end.

4. A base as defined in claim 3, wherein said apertures are concave surfaces which alternate with convex surfaces and the strainer or colander sits on said convex surfaces.

5. A base as defined in claim 3, wherein said upper end has flat surfaces between said apertures.

6. A base as defined in claim 3, wherein said apertures are equi-distantly spaced from one another.

7. A base as defined in claim 1, wherein said at least one aperture is a plurality of spaced apart apertures in said lower end.

8. A base as defined in claim 7, wherein said apertures are concave surfaces which alternate with convex surfaces and said body portion contacts the surface of the sink/basin at said convex surfaces.

9. A base as defined in claim 7, wherein said lower end has flat surfaces between said apertures.

10. A base as defined in claim 7, wherein said apertures are equi-distantly spaced from one another.

11. A base as defined in claim 1, wherein said at least one aperture is a plurality of spaced apart apertures in said upper end and a plurality of spaced apart apertures in said lower end.

12. A base as defined in claim 11, wherein said apertures in said upper end are concave surfaces which alternate with convex surfaces and the strainer or colander sits on said convex surfaces; and
   and wherein said apertures in said lower end are concave surfaces which alternate with convex surfaces and said body portion contacts the surface of the sink/basin at said convex surfaces.

13. A base as defined in claim 11, wherein said upper end has flat surfaces between said apertures in said upper end, and said lower end has flat surfaces between said apertures in said lower end.

14. A base as defined in claim 11, wherein said apertures in said upper end are equi-distantly spaced from one another and said apertures in said lower end are equi-distantly spaced from one another.

15. A base as defined in claim 11, wherein said apertures in said upper end are not aligned with said apertures in said lower end.

16. A base as defined in claim 1, wherein said at least one aperture is formed by said upper end, said lower end and a plurality of ribs which space adjoining apertures apart from each other.

17. A base as defined in claim 16, wherein said ribs are generally perpendicular to said upper end and said lower end.

18. A base as defined in claim 16, wherein said ribs join with said upper end at an upper joint defined by spaced apart locations and join with said lower end at a lower joint defined by spaced apart locations, said upper joint of each respective rib being non-aligned with said lower joint of each respective rib.

19. A base as defined in claim 1, wherein said predetermined height of said body portion from said upper end to said lower end is at least 1.1 inches.

20. A base as defined in claim 1, wherein said lower end of said body portion has a dimension which is greater than a dimension of said upper end of said body portion.

21. A base as defined in claim 20, wherein said dimension of said upper end is defined by a diameter of which is greater than 3.0 inches, and said dimension of said lower end of said body portion is defined by a diameter which is greater than 3.25 inches.

22. A base as defined in claims 1, wherein said upper end is defined by a diameter of which is greater than 3.0 inches, and said lower end of said body portion is defined by a diameter which is greater than 3.25 inches.

23. A base as defined in claim 1, wherein said body portion is formed from food grade material.

24. A base as defined in claim 1, wherein said body portion is formed from non-food grade material.

25. A base as defined in claim 1, wherein said body portion is formed from plastic.

26. A base as defined in claim 1, wherein said body portion is formed from metal.

27. A base as defined in claim 1, wherein said body portion is formed from wood.

* * * * *